(No Model.)

A. KAHN.
EYEGLASSES.

No. 382,987. Patented May 15, 1888.

Witnesses.
Will T. Norton
Guy E. Mitchell

Inventor,
Amelia Kahn
By her Attorneys,
John J. Halsted & Son

UNITED STATES PATENT OFFICE.

AMELIA KAHN, OF ST. JOSEPH, MISSOURI.

EYEGLASSES.

SPECIFICATION forming part of Letters Patent No. 382,987, dated May 15, 1888.

Original application filed March 21, 1887, Serial No. 231,713. Divided and this application filed March 9, 1888. Serial No. 266,708.

(No model.)

*To all whom it may concern:*

Be it known that I, AMELIA KAHN, of the city of St. Joseph, in the county of Buchanan and State of Missouri, have invented certain new and useful Improvements in Eyeglasses; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My present invention relates to the nose-guards of eyeglasses, and more especially to a special construction of the same, and to the relation of the same to the glass-frame or to the glass.

It consists in nose guards having their upper end adjustably secured to the glass or to its frame, and having the lower end unattached and normally free to move either in or out relatively to the edge of the glass, but having its forward or backward movement restricted by the sides of the frame or glass, and in the same when provided with yielding pads, all more particularly as hereinafter set forth.

Figure 1:
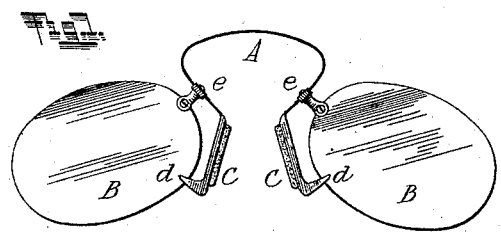
Figure 2:
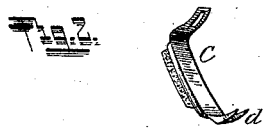
Figure 3:
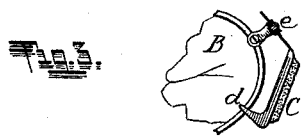

In the accompanying drawings, Figure 1 illustrates an eyeglass having my improvement applied thereto; Fig. 2, the nose-guard and its attached pad detached from the eyeglass, and Fig. 3 a fragmentary view showing a rimmed glass.

This application is a division of my former application, Serial No. 231,713, filed March 21, 1887, and therefore the eyeglass, as a whole, need not be described in detail further than may be necessary to make clear the invention to which this application particularly relates.

A is the bow-spring which connects the two glasses B B, and C C are respectively the novel nose-guards, which are peculiar in character and constitute the main feature of my present invention. These guards are formed at their lower ends with prongs or projections $d\ d$, which span the glass, but are not positively secured or attached to it in any manner, nor to the metal frame or rim around the glass, (in case the glass should have such a frame or rim.) These guards are springs, and at their upper ends they are each adjustably secured to the glass or its frame by means of an adjusting screw, $e$, whereby they may be adjusted to suit the convenience of the wearer; but their lower ends, while spanning the glass, are yet always free to move inward and outward relatively to the edge of the glass, while at the same time the faces of the glass prevent the lower end of this guard from being moved forward or backward away from the glass, these faces or sides of the glass serving to restrict or prevent such movement. By this means, while all the required easy yield of the guards is insured, at the same time their lower ends are not allowed to stand off or hang out in free space away from the glass, and thus to be liable to catch in the garments, or in the cord or chain on which eyeglasses are usually hung, and thereby to be broken, or, if not broken, to afford a constant source of annoyance, and catching, and fear of breaking.

I prefer to have pad-boxes or grooves on the nose-guards adapted for holding pads, preferably made of a flexible compound of gutta-percha and india-rubber; or they may be of gutta-percha, or india-rubber, or leather, or fibrous material, such elastic yielding material being preferably held in its place in the box or groove by its own resilience. But I prefer the compound of gutta-percha and india-rubber, and it may be secured to the nose-guard on its outside by rivets or an adhesive material.

I claim—

1. Nose-guards having their upper end adjustably secured to the glass or its frame, and having the lower end unattached and normally free to move either in or out relatively to the edge of the glass, but having its forward or backward movement restricted by the sides of the frame or glass itself, substantially as and for the purpose set forth.

2. Nose-guards provided with pads of yielding material, as described, and having their lower end unattached and normally free to move in or out relatively to the edge of the glass, but having the forward and backward movement restricted by the sides of the frame or glass itself, substantially as and for the purposes set forth.

AMELIA KAHN.

Witnesses:
SIMON MENDEL,
F. G. SARGENT.